United States Patent [19]

Gordon et al.

[11] 4,106,070
[45] Aug. 8, 1978

[54] HAZARDOUS VOLTAGE PROTECTOR FOR TELEPHONE LINE

[75] Inventors: Alan Mayer Gordon, Matawan Borough; Edward Francis Mazurek, Spotswood; Arden Bernard Wright, Freehold, all of N.J.

[73] Assignee: Bell Telephone Laboratories, Incorporated, Murray Hill, N.J.

[21] Appl. No.: 764,594

[22] Filed: Feb. 1, 1977

[51] Int. Cl.² ............................................. H02H 3/28
[52] U.S. Cl. ...................................... 361/42; 361/45; 361/60
[58] Field of Search .................... 361/45, 42, 60, 187; 179/175.3 F

[56] References Cited

U.S. PATENT DOCUMENTS 3,725,613  4/1973  Allen et al. .................. 179/175.3

FOREIGN PATENT DOCUMENTS 45,865  7/1962  Poland ..................................... 361/45

Primary Examiner—Harry E. Moose, Jr.
Attorney, Agent, or Firm—Charles E. Graves; Harry L. Newman

[57] ABSTRACT

Telephone terminal equipments connected to the network through the device described herein are prevented from applying potentially human-hazardous voltages or currents to the network. The device includes a pair of bifilar relay coils, one in each connection to the central office. These operate an associated relay contact only when an unbalanced voltage or current condition occurs on the customer leads. A circuit path is thus completed to operate a second relay, which opens the connection between the customer terminal leads and the network leads; and establishes a path to ground through its own coils for the current from the unbalanced source. Means are included for assuring that the fraction of hazardous voltage appearing across the second relay remains essentially constant in the frequency range of 17 to 60 hertz. Only removal of the unbalanced current can release the relay and restore the network connection.

5 Claims, 2 Drawing Figures

HAZARDOUS VOLTAGE PROTECTOR FOR TELEPHONE LINE

FIELD OF THE INVENTION

This invention relates to safe working conditions for telephone craft-persons; and more specifically to preventing hazardous voltages that may originate in telephone terminal equipment from appearing on the telephone lines.

BACKGROUND OF THE INVENTION

Telephone crafts-persons such as splicers, often have to handle in-service telephone wires bare-handed. While the telephone network operates at normal voltages well below values that could be human-hazardous, there remains the possibility of unintended application of foreign voltages high enough in magnitude to jeopardize these crafts-people.

One potential source of such voltages is the terminal equipment itself, which occasionally include circuits connected to commercial power. The design, manufacture, installation, maintenance and repair of telephone terminal equipment by a single responsible entity has in the past assured that commercial voltages present in the terminal do not appear on the telephone line. However, with the recent expansion of the direct connection of customer (as opposed to telephone company) owned and maintained equipment, the power to protect craftspersons from hazardous voltages is no longer primarily that of the telephone company. The risks which this situation poses to telephone crafts-persons, and on a different plane, to central office equipment, is recognized by industry groups and regulators.

Devices have been employed in the past to provide a protective barrier for the telephone network against several types of harms that can originate in customer-provided equipment. Few of these, however, have provided solely hazardous voltage protection. Additionally, circuit requirements for such devices in the past have not been adequately predicated upon the nature of the hazard itself. Studies have revealed that the main factors affecting voltage shock severity are: the level and duration of current applied through a human body; the current path through the body; and the individual's body weight. The critical concern thus is electrical current.

Additionally, a majority of telephone lines operate with balanced, non-grounded terminations; and with metallic signaling. An effective method of detecting and protecting against the application of hazardous voltages originating in terminal equipment must take these conditions into account as well.

SUMMARY OF THE INVENTION

This invention recognizes a principle of hazardous voltage protection based on detecting longitudinal current on a telephone line in excess of a threshold level. Upon detection, both sides of the connection to the telephone line are immediately opened to electrically disconnect the hazard from the telephone line. The longitudinal current is now routed through an alternate path to maintain the disconnect condition until the hazardous potential is removed.

The phase side of commercial 120 volt power supplied throughout the United States of America is provided on a grounded neutral line configuration. The phase side thus is inherently unbalanced. Pursuant, therefore, to one aspect of the invention, it is the application of an unbalanced potential to the tip and ring telephone line connections of a terminal equipment that operates the protective device. Any contact of the phase side of a 120 volt AC with either the tip or ring network connections operates the device.

The protector must not activate in response to balanced metallic voltages such as are associated with standard telephone metallic ringing current and with offhook loop current supplied from the telephone central office. Accordingly, the device will not protect against the application of balanced metallic hazardous voltages. These, however, cannot occur by happenstance, except under the most remote of conditions.

Pursuant to a particular facet of the invention, the protector is designed to operate at substantially any applied frequency of hazardous voltage. The protective circuit is designed specifically to be nearly equally sensitive to current levels at all points in the principal frequency range of interest — 60 hertz through 17 hertz; the circuit is also sensitive to DC, however.

In an illustrative embodiment of the invention, a pair of relays operate in sequence to open the connections between the terminal equipment and the telephone line. The first relay has a pair of bifilar windings connected respectively in the tip and ring leads to the central office. Normal equipment operation involving balanced potentials such as ringing signals, busy signals, etc., generate two flux fields which cancel each other thereby keeping the first relay unoperated. Any of a number of hazardous conditions occurring on the customer side cause currents through the bifilar windings which are not balanced, and thus cause the first relay to operate. In response, a current path is set up which routes the hazardous voltage to the coils of the second relay which in turn operates to effect complete disconnection of the terminal from the line. The current path for the bifilar coils of the first relay is thus interrupted, but the current path set up to operate the second relay is maintained.

The invention will be further described and defined in the description to follow taken with the accompanying drawing in which:

FIG. 1 is a circuit diagram of the protector installed in a typical connecting path between a telephone central office and telephone terminal equipment; and FIG. 2 is a circuit diagram of an illustrative embodiment of the protector.

DETAILED DESCRIPTION OF ILLUSTRATIVE EMBODIMENT

Figure 1:
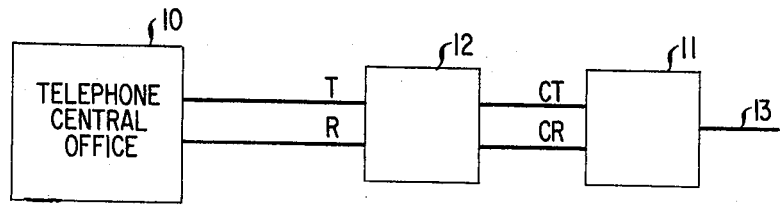

FIG. 1 illustrates a part of a telephone system in which the protector of the present invention is used. Telephone central office denoted 10 is connected with a terminal equipment 11, through a loop consisting of network connections tip conductor T and ring conductor R, customer line connections tip lead CT and ring lead CR, and protector 12, which interconnects the network and customer equipment. Equipment 11 includes a commercial power connection denoted 13; and could for example be a key telephone unit connected to a central office by several lines one of which is illustrated.

Figure 2:
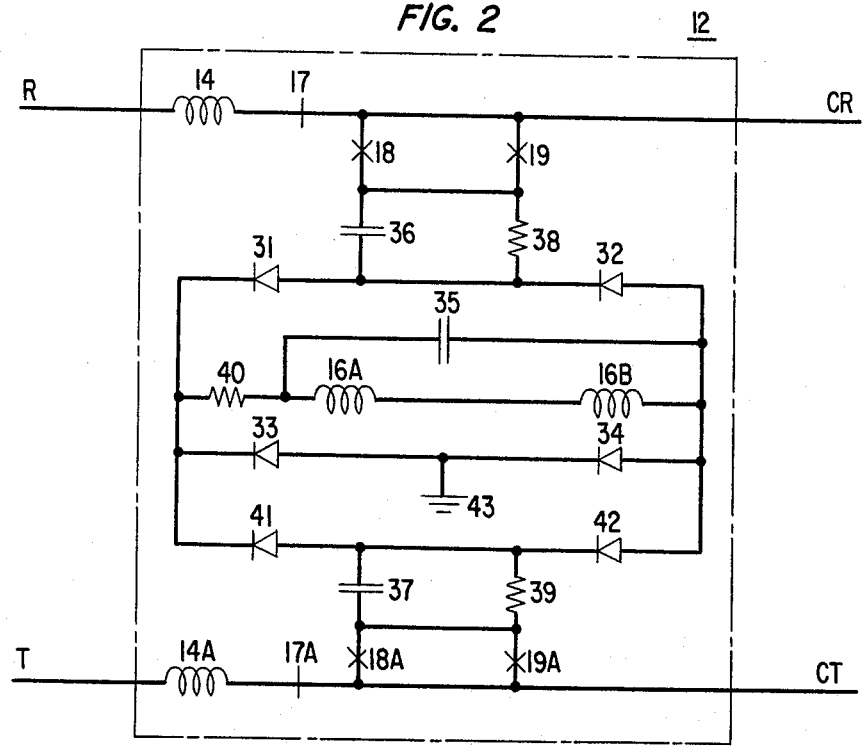

Referring to FIG. 2, the protector 12 comprises a line relay having bifilar windings 14, 14A respectively included in the ring and tip paths connected to the R and T conductors of the telephone line. Make contacts 19, 19A are associated with the line relay coils 14, 14A. In addition, transfer contacts 17, 18 and 17A, 18A are associated with coils 16A, 16B of a transfer relay.

Diodes 31, 32, 33, 34 constitute a full wave rectifying bridge, deriving a DC voltage to operate the coils 16A, 16B. Capacitor 35 is a storage element to hold the transfer relay operated during the zero crossings of the hazardous voltage. The networks consisting of capacitors 36, 37, resistors 38, 39, supply adequate impedance in the frequency range of from 17-60 hertz to limit the voltage impressed on the windings 16A, 16B. Additionally resistor 40 provides arcing protection for make contacts 19, 19A. The parameter values of this network are chosen such that the fraction of the hazardous voltage appearing across the coils 16A, 16B remains essentially constant at all points in the frequency range of from 17-60 hertz.

Under normal operating conditions in which ringing, busy signal, hold signal, or talking signal is present, the two magnetic flux fields in coils 14, 14A, cancel each other and contacts 19, 19A remain open.

When a potential is applied to either customer lead CT or CR, or to both leads CT and CR with respect to ground, the line relay will operate. When this potential is applied to only lead CT, lead CR may be open or grounded. Similarly, when applied only to lead CR, lead CT may be open or grounded. Advantageously, operation occurs when the longitudinal current exceeds about 26 milliamperes DC or peak AC if applied to either lead CT or CR; or about thirteen milliamperes if applied to both lead CT and lead CR.

If a voltage is impressed, for example, on lead CR with lead CT open, the current path includes relay coil 14, telephone line conductor R, and equipment (not shown) in the central office 10, which is of sufficiently low impedance to enable this amount of current to pass. If a crafts-person's hand happens to be in contact with line conductor R at some point between the protector 12 and the central office, his body supplies a further path to ground. As a result, the line relay operates to close contacts 19, 19A. During positive half cycles, current flows through contact 19, capacitor 36, resistor 38, diode 31, resistor 40, capacitor 35, and windings 16A, 16B, of the transfer relay; and through diode 34 to ground. During negative half cycles, current flows from ground through diode 33, resistor 40, capacitor 35, windings 16A and 16B of the transfer relay, diode 32, capacitor 36, resistor 38 and closed contact 19 to lead CR.

When the voltage on capacitor 35 has risen sufficiently to operate the transfer relay, break contacts 17, 17A open the paths from leads CR and CT through the respective coils 14, 14A thus isolating the telephone network from the hazardous voltage and releasing contacts 19, 19A. The path for the hazardous voltage from lead CR then is through contact 18.

As long as the fault condition persists, the transfer relay contacts remain operative, keeping the network isolated from the hazardous voltage and supplying a path through the transfer relay for the current to keep the relay operating. Only when the hazard condition is removed can the transfer relay release to restore the local equipment connection to the telephone line.

The hazardous voltage protector of FIG. 2 can be constructed with component values that will remove all voltages of between 50 and 300 volts rms and at any frequency in the range from 17-60 hertz and DC, if applied to each of the following: (1) between leads CT and CR tied together, and ground terminal 43; (2) between leads CT and ground terminal 43, with lead CR open or grounded; (3) between lead CR and ground terminal 43 with lead CT open or grounded.

It should be noted that the protective circuitry described above is not usable with party lines which use a grounded ringer, nor with ground start lines as are used in most coin telephone lines and PBX lines. In these instances, the current normally applied from the central office through the ground path could cause unwarranted operation of the protector.

The spirit of the invention is embraced in the scope of the claims to follow.

What is claimed is:

1. A high voltage protector circuit for providing an interface between terminal equipment having tip and ring leads and a telephone line including tip and ring conductors connected to a central office, the circuit comprising:
   tip and ring paths for connecting the tip and ring leads of the terminal equipment to the tip and ring conductors of the telephone line;
   means for detecting a current imbalance in the tip and ring paths; and
   means responsive to the detecting means for disconnecting the terminal equipment from the telephone line and for restoring the connection only upon removal of the current imbalance, the disconnecting and restoring means including
   a first relay comprising a coil having one end for connection to ground, make contacts connecting the other end of the coil to the tip and ring paths, and break contacts in the tip and ring paths on the central office side of the make contacts, and
   means in the circuit from the tip and ring paths to the coil for blocking the flow of current from one path to the other.

2. A circuit as in claim 1 wherein the detecting means comprises a second relay having bifilar windings in the tip and ring paths and make contacts for connecting the tip and ring paths to the coil of the first relay, the break contacts of the first relay being located between the bifilar windings and the make contacts of the second relay.

3. A circuit as in claim 1 wherein the disconnecting and restoring means includes means for assuring that of the voltage applied to the tip and ring paths, the fraction appearing across the first relay coil remains approximately constant for the frequencies of 17 to 60 hertz.

4. A circuit as in claim 1 wherein the disconnecting and restoring means includes an RC network in the path from the ring and tip conductors to the relay coil, the parameters of the RC network being such that of the voltage applied to the tip and ring paths, the fraction appearing across the coil remains essentially constant for the frequency range of 17 to 60 hertz.

5. A circuit for isolating a telephone line from a terminal connected to the line comprising:
   first means for sensing an unbalanced voltage condition on one or more output leads of the terminal; and
   second means responsive to the sensing means for opening the path between the telephone line and the terminal and for completing a local path between one or more of the output leads and ground and responsive to removal of the unbalanced voltage for restoring the path between the telephone line and the terminal, the second means including a relay coil and means for assuring that of the voltage applied to the output leads of the terminal, the fraction appearing across the relay coil remains approximately constant for the frequencies of about 17 to 60 hertz.

* * * * *